350-383 SR
XR 3,466,433

Sept. 9, 1969 W. L. DUDA ET AL 3,466,433

OPTICAL PARALLEL ADDER

Filed Dec. 14, 1965 3 Sheets-Sheet 1

INVENTORS
WILLIAM L. DUDA
HAROLD FLEISHER
WERNER W. KULCKE
ERHARD MAX

BY Charles P. Boberg
ATTORNEY

3466433
OR IN 364/713

FIG. 2
| BINARY NUMBERS TO BE ADDED | 3RD COL | 2ND COL | 1ST COL | DECIMAL EQUIVALENTS |
|---|---|---|---|---|
| 1ST NUMBER | 0 | 1 | 0 | 2 |
| 2ND NUMBER | 0 | 1 | 1 | 3 |
| 3RD NUMBER | 1 | 1 | 0 | 6 |
| 4TH NUMBER | 1 | 1 | 1 | 7 |
| 5TH NUMBER | 0 | 0 | 1 | 1 |
| 6TH NUMBER | 1 | 0 | 0 | 4 |
| 7TH NUMBER | 1 | 0 | 1 | 5 |
| BINARY SUM 1 1 | 1 | 0 | 0 | DECIMAL SUM 28 |
BEAM DISPLACEMENTS
TOTAL UNITS OF VERTICAL DISPLACEMENT-Y
| | $X_3$ | $X_2$ | $X_1$ | |
|---|---|---|---|---|
| UNITS OF HORIZONTAL DISPLACEMENT | 4 | 4 | 4 | |
| RESULTING VERTICAL DISPLACEMENTS | 16 + | 8 + | 4 | = 28 |
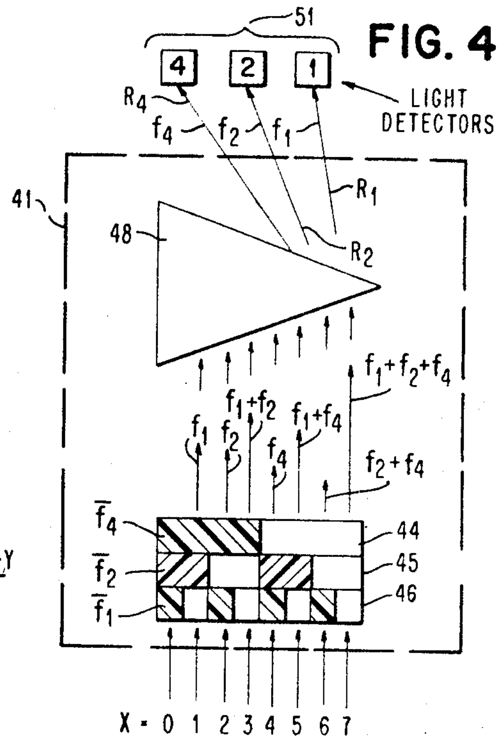
FIG. 4
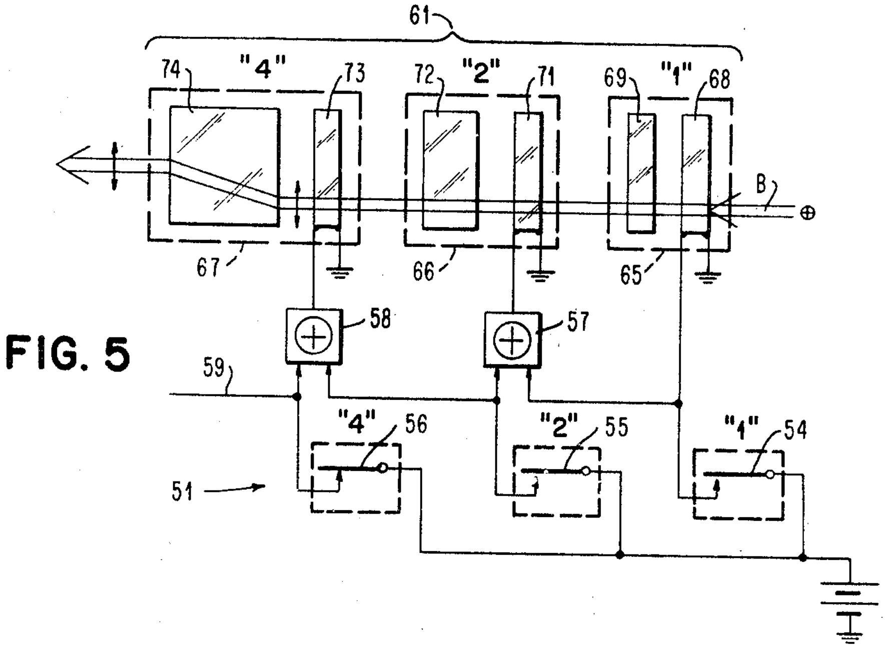
FIG. 5

United States Patent Office 3,466,433

Patented Sept. 9, 1969

3,466,433

OPTICAL PARALLEL ADDER

William L. Duda, Wappingers Falls, Harold Fleisher and Werner W. Kulcke, Poughkeepsie, and Erhard Max, Wappingers Falls, N.Y., assignors to International Business Machines Corporation, Armonk, N.Y., a corporation of New York Filed Dec. 14, 1965, Ser. No. 513,802
Int. Cl. G06f 5/02, 7/385
U.S. Cl. 235—175 6 Claims

ABSTRACT OF THE DISCLOSURE

A parallel optical data processing technique is disclosed for simultaneously adding columns of digits in a plurality of weighted binary orders. Individual digits contained in the respective binary orders of several multi-order binary numbers are entered into separate column registers. There is a column of light-deflecting crystals associated with each register and a source of light associated with each column of crystals. Each column of light-deflecting crystals deflects a beam from its associated light source an amount that is related to the sum of digits in its corresponding register. The displacement of each beam is converted by an optical encoding means to electrical output signals, each signal respectively representing a column subtotal weighted binary notation, namely, 1, 2, 4, 8, etc. Such electrical output signals are applied respectively to aligned groups of additional deflecting crystals, and the latter impart displacements to a single beam of light in accordance with the respective column subtotals. The total beam displacement of the various aligned deflecting crystals represents the grand total of the various column subtotals.

This invention relates to optical data processing systems in which light beam deflecting techniques are employed to perform computations.

A polarized light beam can be selectively deflected to represent the sum of a plurality of single-digit numbers by passing said beam through an aligned arrangement of electro-optic crystals and associated birefringent crystals which are respectively controlled by the various digital inputs. For example, let it be assumed that one wishes to obtain the sum of seven single-digit binary numbers. This may be accomplished according to known techniques by applying the respective binary numbers in the form of "one" and "zero" input signals, as the case may be, to seven electro-optic crystals in the aforesaid crystal assemblage. According to whether a given electro-optic crystal receives a "one" or "zero" excitation, it will or will not cause the incident light beam to be polarized in a given plane. The associated birefringent crystal will then deflect or not deflect the incident beam according to its plane of polarization. If it is assumed that each birefringent crystal in the series can impart one unit of transverse displacement to a properly polarized beam, then with the assumed arrangement it is possible to obtain a beam displacement of from zero to seven units representing the sum of the seven single-order binary digits, all digits being of equal denominational weight.

As a second possibility, it may be desired to displace a light beam by an amount representing the sum of several differently weighted binary digits. Thus, the respective digits of a multi-order binary number may have denominational weights of 1, 2, 4, 8, and so forth, so that "111" for example, has a weighted value of 1 plus 2 plus 4, or a total value of 7 in the decimal system. Here again, an assemblage of electro-optic crystals and associated birefringent crystals can be employed to perform the summation, the only difference in this case being that the respective birefringent crystals have different thicknesses according to their respective denominational weights, each of these crystals having an effective thickness which is either double or half that of the neighboring birefringent crystal. A beam deflecting scheme of this type is shown in an article entitled "A Fast, Digital-Indexed Light Deflector," by W. Kulcke, T. J. Harris, K. Kosanke and E. Max, published in the January 1964 issue of the IBM Journal of Research and Development, pages 64–67.

Still a third possibliity exists if one should desire to obtain the sum of several multi-order binary numbers, which is the usual case in practice. Conceivably this could be accomplished strictly in accordance with the previously known serial adding techniques such as those described above. For instance, if one wishes to add seven three-digit binary numbers, he could arrange seven three-order sets of electro-optic and birefringent crystals in the path of a single polarized light beam for imparting to this beam a total displacement representing the sum of the seven three-digit numbers. This technique would require that the beam traverse twenty-one electro-optic crystals and twenty-one birefringent crystals of various thicknesses, all arranged in a single light path, in order to obtain the aforesaid sum.

It is an object of the present invention to provide a more feasible electro-optic summing apparatus which can perform parallel-column additions of multi-order binary numbers, so that in no instance will a light beam be required to traverse an undue number of crystals.

A further object is to provide a novel light deflecting system whereby a displacement selectively imparted to a light beam coming from one source is automatically transferred to a light beam coming from another source.

A still further object is to enable the displacements respectively imparted to several independent light beams to be concurrently transferred in cumulative fashion to still another light beam in a manner such that the final displacement of the last beam represents the total of the other beam displacements respectively multiplied by any selected factors which one may care to introduce.

In accordance with the principle of the invention as disclosed herein, each binary order of the multi-order binary numbers to be added is represented by an individual column of electro-optic and birefringent crystals through which a polarized white or multichromatic light beam individual to that column is passed. The electro-optic crystals of each column are selectively energized according to the respective digits in that particular order of the multi-order binary numbers to impart a total transverse displacement to the beam representing the sum of the binary digits in that column of the numbers. By means of an encoding device comprising a selective light filter and a spectroscope, the deflected white or multichromatic light beam is converted to one or more light rays of a selected wavelength of wavelengths according to the selective displacement of the beam, and these constituent rays of different wavelengths are caused to impinge upon separate light detectors of which there are fewer than the binary numbers being added. For example, if not more than seven binary numbers are to be added together, then only three light detectors are needed at the output or encoding end of the column, because only three orders of the binary code (1, 2, 4) are needed to represent seven numbers.

The encoded binary signals furnished by the output light detectors of each column then are supplied to corresponding electro-optic crystals in a final array of deflecting crystals, through which the totalizing light beam passes. The birefringent deflecting crystals in the groups respectively associated with the various columns are proportioned in the same ratios to each other within each set, but their deflecting powers are different for the different columns. More specificallly, the deflecting crystals for the lowest-order column can be selectively energized for displacing the beam by one unit, two units, four units, and so forth. In the next higher-order column, however, the corresponding crystals can be selectively energized for displacing the beam by two units, four units, eight units, and so forth. In the third column, displacements of four units, eight units, sixteen units, and so forth are available. Hence, for example, an output of "1" in the third column will displace the beam twice as far as an output of "1" in the second column, and four times as far as an output of "1" in the first column; or in other words, these displacements are related according to the ratios of the powers of two represented by the respective binary orders.

By using this arrangement one can, for example, obtain obtain the sum of seven three-order binary numbers (containing a total of twenty-one binary digits) without requiring any light beam to traverse more than a maximum of nine electro-optic rotating crystals and nine birefringent deflecting crystals. The additions are performed instantaneously in parallel, throughout the array.

The foregoing and other objects, features and advantages of the invention will be apparent from the following more particular description of a preferred embodiment of the invention, as illustrated in the accompanying drawings.

In the drawings:

FIG. 2 is a tabular representation of a particular numerical example which can be handled by the system shown in FIG. 1.

FIG. 4 is a schematic illustration showing some of the details in the apparatus of FIG. 3.

FIG. 5 is a schematic illustration showing a typical crystal group in the final totalizing subassembly of the system shown in FIG. 1.

Figure 1:
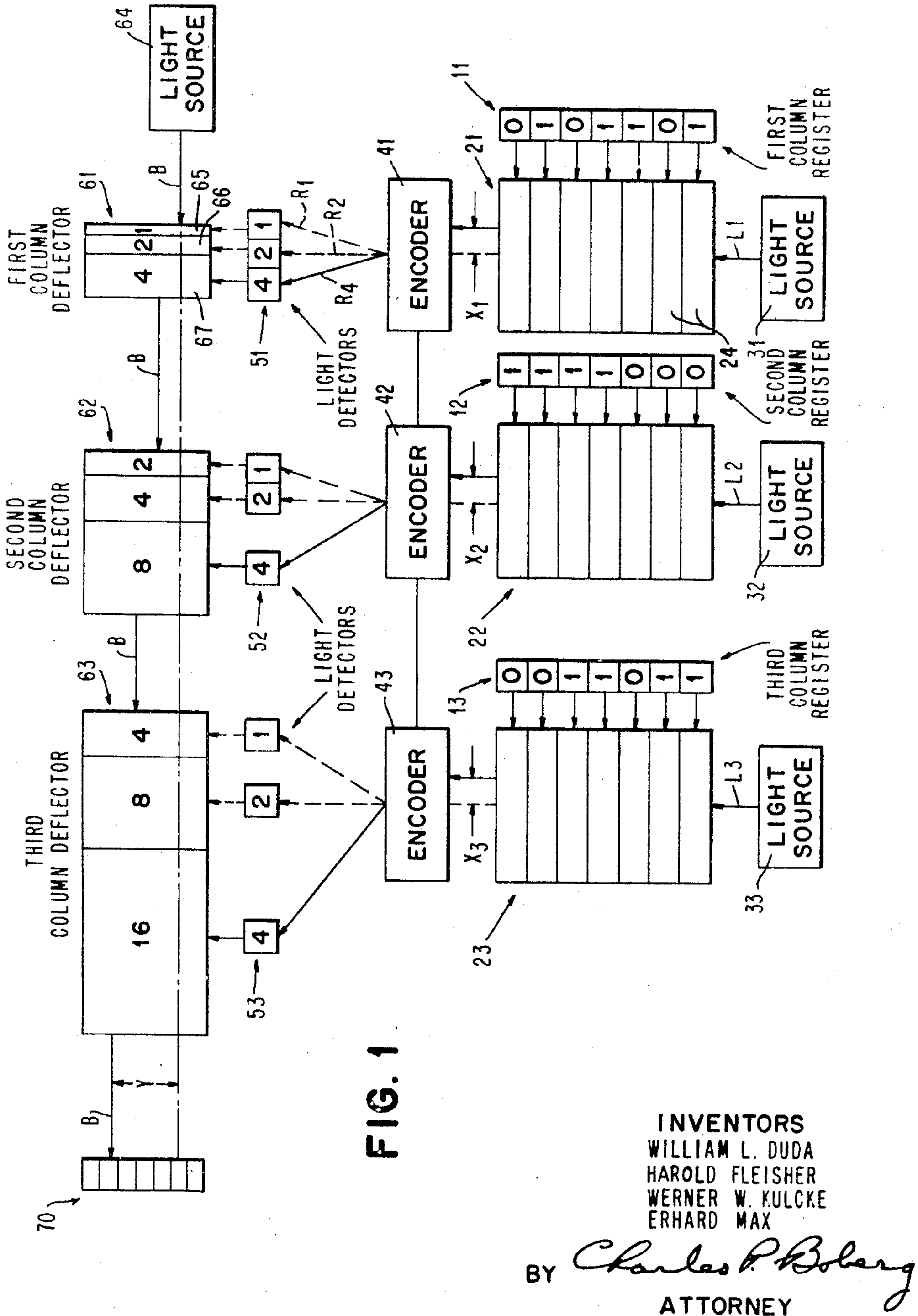
FIG. 1 is a schematic representation of a parallel electro-optical adder designed in accordance with the principles of the invention.

In FIG. 1 there is shown schematically, by way of example, a parallel electro-optical adding system for obtaining the sum of seven three-order binary numbers. A mathematical exercise exemplifying an addition of this kind is tabulated in FIG. 2. The seven binary numbers listed in this table have a sum of "11100," expressed in binary notation. This is equivalent to "28" in decimal notation. In the illustrated scheme no means is provided for representing the final sum in binary notation, although such means could be provided if desired. As indicated in FIG. 1, the sum is represented by the final vertical displacement Y of a light beam B, this displacement Y equaling 28 units in the present example. Although it is assumed herein that the displacement Y is in the vertical direction, it will be understood that this orientation is chosen merely as a matter of convenience in describing the operation of the invention.

The seven binary-coded numbers representd in FIG. 2 have digits which fall respectively into three columns, each corresponding to a respective binary order. According to the method herein disclosed, the three columns of digits are registered respectively in the first, second and third column registers 11, 12 and 13, FIG. 1. These column registers 11, 12 and 13 are associated respectively with columns or sets of light deflecting crystals generally designated 21, 22 and 23, the internal construction of which will be described in detail hereinafter.

Associated with the columnar crystal groups 21, 22 and 23, respectively, are suitable light beam sources 31, 32 and 33, each of which directs a beam of plane-polarized light $L_1$, $L_2$ or $L_3$ through its asociated deflecting crystal assembly. According to the respective settings of the digital storage elements in each of the column registers, the light beam which emerges from the crystal assembly in the associated column will have a horizontal displacement $X_1$, $X_2$, or $X_3$, as the case may be, representing the sum of the digits in that column. (While these beam displacements are assumed herein to be horizontal, such orientation is chosen merely for convenience.) Encoders 41, 42 and 43, respectively associated with the first, second and third columns of crystals 21, 22 and 23, are adapted to translate each beam displacement X into a binary-coded column output signal represented by one or more diverging light rays $R_1$, $R_2$ or $R_4$, FIG. 1, which are directed so that they separately impinge upon light detectors such as those included in the group designated 51 in FIG. 1.

In the present instance it is assumed that the illustrated system will not be required to add more than seven numbers, so that each column will have no more than seven binary digits to be added. The output of such a column, therefore, can be represented in binary code by three light detectors such as the ones included in group 51, which are respectively designated "1," "2" and "4" in FIG. 1 to correspond with the weighted binary code values which they represent. For example, if the number of digits in a particular column totals "5," then the light detectors corresponding to the binary values "1" and "4" will be activated. According to the sum which is obtained in each column addition, each of the light detectors 51, 52 and 53 will furnish a pattern of output signals to an associated electro-optic crystal assemblage such as 61, 62 or 63 in the final totalizing crystal array of the system.

The totalizing light beam B is passed successively through the crystal groups 61, 62 and 63, which respectively are activated by the output signals from the sets of light detectors 51, 52 and 53 associated with the column output encoding devices 41, 42 and 43, respectively. The crystal groups 61, 62 and 63 differ from one another only in the effective thicknesses of the constituent deflecting crystals. Thus, the crystal group 61 in the first column contains crystals which respectively displace the light beam B through one unit, two units or four units of distance vertically, or any combination of these, according to the manner in which the light detectors 51 of the first column have been activated. In the second column, however, the constituent crystals of the set 62 are adapted to displace the light beam B so as to cause beam displacements of two units, four units, eight units, or any combination of these, according to the manner in which the second-column light deflectors 52 have been activated. In the third column the crystal set 63 contains deflecting crystals adapted to produce beam displacements of four units, eight units, sixteen units, or any combination thereof, according to the manner in which the third-column light detectors 53 have been activated.

Thus, it can be seen that there is a partly overlapped, progressive increase in the beam-displacing powers of the respective crystal groups 61, 62 and 63, according to the progressions 1:2:4—2:4:8—4:8:16. Therefore, if all of the horizontal beam displacements $X_1$, $X_2$ and $X_3$ in the respective columns, FIG. 1, are equal, then the respective vertical displacements of the beam B will increase by a factor of two as the beam B passes from one to another of the column groups along its path. The ultimate vertical displacement Y of the beam B is measured by any suitable means, such as a cellular light detecting device 70 in which a selected one out of, say, fifty light-sensitive cells is activated according to the vertical level at which the emerging beam is positioned.

The foregoing is a general description of a possible light deflecting system for performing parallel multi-order binary additions in accordance with the principles of the invention. It should be explained in this connection that the particular arrangement illustrated in FIG. 1 is premised upon the assumption that not more than seven binary numbers having a maximum of three binary orders will be added together at any one time. If a greater quantity of binary numbers is to be totaled, then the number of light detectors in each of the sets 51, 52 and 53 will have to be increased in order to handle the larger magnitude of the respective column outputs. Similarly, as the number of binary orders is increased, additional sets of light detectors and deflecting crystals (such as 53 and 63, for example) will have to be provided. The illustrated mathematical example (FIG. 2), which is of an elementary nature, was selected merely for convenience in order to present a simplified showing of the invention.

Figure 3:
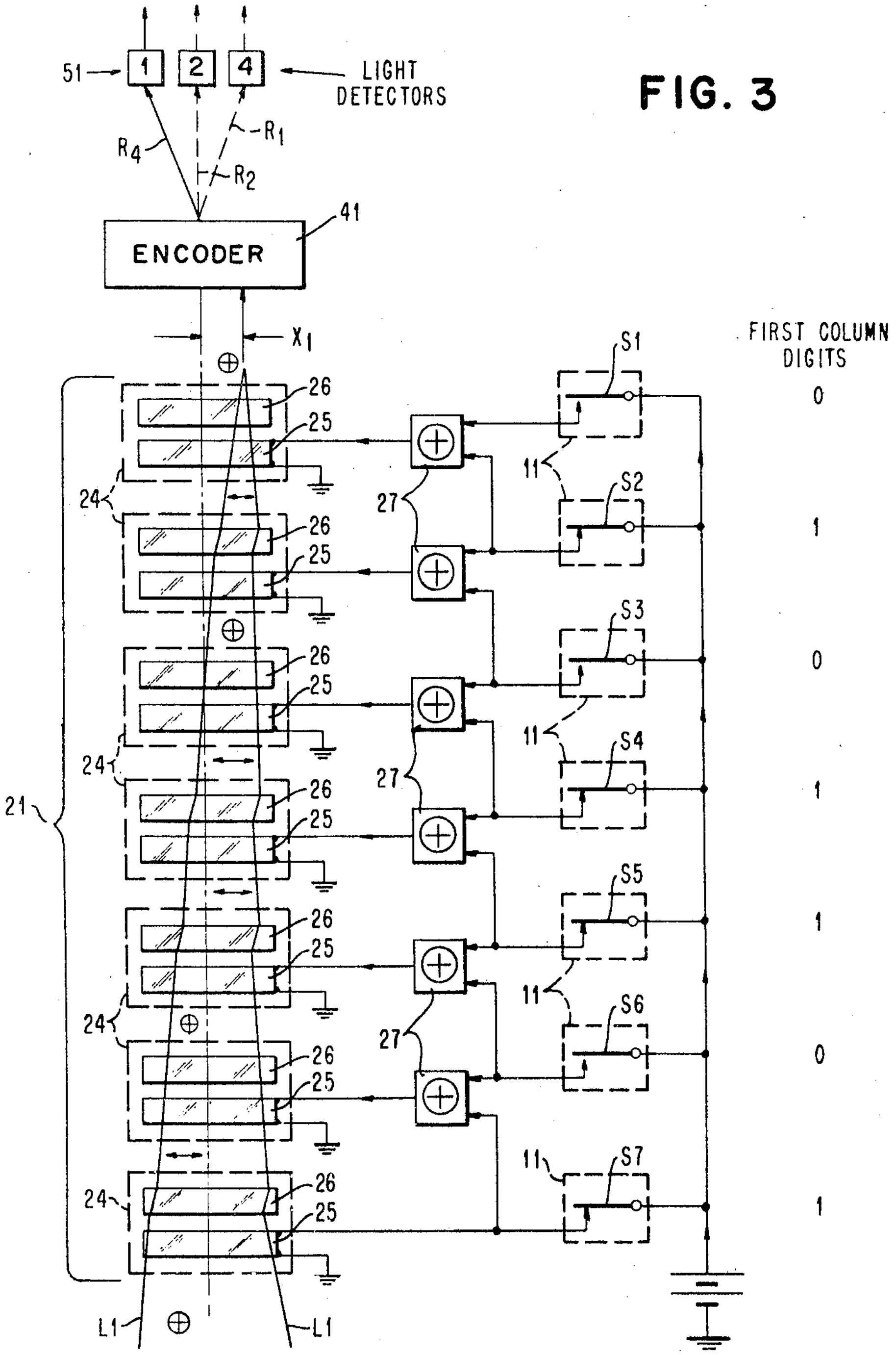
FIG. 3 is a partial schematic representation of a typical column subassembly in the system of FIG. 1.

FIG. 3 shows in more detail the constituent elements of a column deflecting assembly such as 21, FIG. 1. Inasmuch as we are assuming a maximum of seven digits to be totaled per column, there are seven crystal pairs 24 included in the column assembly 21. Each crystal pair 24 comprises an electro-optic rotating crystal 25 and a birefringent deflecting crystal 26. The electro-optic crystals 25 are adapted to be selectively energized by voltages applied thereto through switches $S_1$ through $S_7$, which are respectively included in the first column register devices 11. Each crystal 25, when it is energized, functions as a half-wave plate for causing the polarization plane of the incident light beam to be rotated ninety degrees. If the crystal 25 is not energized, however, it has no rotative effect upon the polarization plane of the light beam passing through it.

Each of the birefringent crystals 26 is so constituted that, for example, it will not refract a light beam polarized in a given plane, but will refract a light beam polarized in a plane perpendicular to the given plane. It is assumed herein that the incident light beam $L_1$ is a converging beam which initially is polarized in a plane perpendicular to the plane of the paper, as indicated in FIG. 3. The beam first passes through the lowermost electro-optic crystal 25 associated with the switch $S_7$, which is assumed to be closed in the present example. Hence, the lowermost crystal 25, being energized, rotates the plane of polarization ninety degrees so that light emerging from the crystal 25 is polarized in the plane of the paper. Under these conditions the associated birefringent crystal 26 will refract the light beam, thereby effectively displacing the beam transversely (that is, horizontally, in this instance). Each of the crystals 26 will impart the same amount of displacement to a beam of given polarity.

Each of the switches $S_1$ and $S_6$ is associated with an individual EXCLUSIVE-OR circuit 27, FIG. 3, each of which receives two inputs, one from its own switch and one from an adjoining switch, as shown. Normally, if a switch such as $S_7$ is closed, it will energize not only its own electro-optic crystal 25 but also (through an EXCLUSIVE-OR circuit 27) it will energize the next succeeding electro-optic switch 25, provided the switch such as $S_6$ associated therewith is open at this time. The purpose of this logical circuit arrangement is to restore the light beam polarization to its initial plane, in the event that it has been rotated therefrom, before the beam $L_1$ encounters the next birefringent deflecting crystal 26. If, in the present example, switch $S_6$ already had been closed, however, this restoring effect would have been cancelled inasmuch as the EXCLUSIVE-OR circuit 27 will give no output if more than one input is applied thereto, and under these conditions the polarization plane of the beam will not be returned to its initial orientation.

As already mentioned, the beam $L_1$ is assumed to be a convergent beam of plane-polarized light. This beam may be composed of white light, or it may be a multichromatic beam containing monochromatic light rays of at least three readily distinguishable wavelengths or frequencies, the purpose of this requirement being explained presently. The beam $L_1$ emerges from the deflecing crystal column 21 as a focused beam having a horizontal displacement $X_1$ from its original path or axis, as indicated in FIG. 3. This horizontal beam displacement is translated by the encoder 41 into a corresponding combination of one, two or three monochromatic light rays $R_1$, $R_2$ and $R_4$ of different frequencies $f_1$, $f_2$ and $f_4$ Thus, if the beam displacement $X_1$ is four units, a single ray $R_4$ will emerge from the encoder 41. If the displacement $X_1$ were three units, the rays $R_1$ and $R_2$ would emerge, and so forth.

FIG. 4 shows in greater detail an exemplary construction of an encoder such as 41. In the present example it is assumed that three color filters 44, 45, and 46 are arranged so that they will selectively absorb light of various predetermined frequencies. For simplicity, it will be assumed that the incident light entering the encoder 41 contains only the frequencies $f_1$, $f_2$ and $f_4$. If light of other frequencies is present, it can be filtered out in advance, if necessary. For each beam deflection X there will be a unique combination of color filters 44, 45 and 46 interposed in the light path, so that the light emerging from these filters 44, 45 and 46 has a selected frequency or combination of frequencies representing the summation of digits in that column. A spectroscope 48, represented in FIG. 4 by a simple prism, separates the light rays of different frequencies, thereby causing light of frequency $f_1$ to impinge upon a certain one of the light detectors 51, which is designated "1"; whereas light of frequency $f_2$ impinges upon a light detector designated "2," and light of frequency $f_4$ impinges on a light detector designated "4." In this way the horizontal displacement of the light beam is converted into a binary-coded numerical representation as represented by the pattern of output voltages furnished by the light detectors 51.

It will be understood, of course, that the arrangement described in connection with FIGS. 3 and 4 can be repeated for the other columns of the adder. This is not the only type of summing and encoding apparatus which is suitable for this purpose, and a variety of equivalent schemes could be devised by one skilled in the art without departing from the teachings of the invention.

The final totalizing light beam B, FIG. 1, is a beam of plane-polarized light furnished by a suitable source 64. The beam B first traverses the set of deflecting crystals 61 associated with the first column. As shown in FIG. 5, each set of crystals such as 61 includes constituent crystal pairs 65, 66 and 67. The crystal pair 65 has an electro-optic crystal 68 and a birefringent crystal 69. Crystal 68 is adapted to be energized by the "1" switch 54 which is included in the light detector assembly 51. When energized, the crystal 68 functions as a half-wave plate for rotating the polarization plane of the beam B through ninety degrees. If not energized, the crystal 68 passes the beam B without change. In the present instance it is assumed that switches 54 and 55 respectively allocated to the weighted values "1" and "2" are open and that the "4" switch 56 is closed. Under these conditions the crystals 68, 69, 71 and 72 are not effective to cause any change in the polarization of the light beam B. Crystal 73, being energized, acts as a half-wave plate to rotate the polarization plane ninety degrees, thereby causing the beam B to be deflected by the birefringent crystal 74.

EXCLUSIVE-OR circuits 57 and 58, FIG. 5, are associated with the electro optic crystals of the assemblage 61 in a manner similar to that explained hereinabove with respect to FIG. 3. A conductor 59. FIG. 5, extends from the final switch 56 in this series to an EXCLUSIVE-OR circuit associated with the "1" switch in the next or second-column series of light detecting devices, thereby extending the logical control circuitry from one column to the next. The function of the EXCLUSIVE-OR circuits, as explained hereinabove, is to cause the polarization plane of light beam B to be restored to its original orientation after each rotation thereof, except where the next succeeding stage itself calls for a rotational action.

Except for the differences in the respective thicknesses of their birefringent deflecting crystals, the crystal sets 62 and 63, FIG. 1, respectively associated with the second and third columns have a construction substantially identical with that of the crystal set 61 just described. That is to say, each of the sets 61, 62 and 63 contains (in the assumed example) three electro-optic polarization-rotating crystals and three birefringent deflecting crystals. Thus, the light beam B, in totaling up all of the column outputs for the three columns, traverses a total of nine electro-optic crystals and nine birefringent crystals. This is the maximum number of crystals which must be traversed by a light beam in the illustrated system.

The parallel adding arrangement shown and described herein greatly reduces the number of crystals that must be traversed by a light beam in comparison with the number of crystals such a beam would have to traverse in a serial adder. Under the conditions assumed herein, a serial adding arrangement would require the light beam to pass through at least 21 electro-optic crystals and 21 birefringent crystals (assuming that each of the input numbers is encoded in the 1–2–4 code).

While the invention has been particularly shown and described with reference to a preferred embodiment thereof, it will be understood by those skilled in the art that various changes in form and details may be made therein without departing from the spirit and scope of the invention.

What is claimed is:

1. Light deflecting apparatus comprising:

a column of light deflecting stages alined so that a beam of plane-polarized light may be passed through each of said stages with or without deflection thereof depending upon its plane of polarization, each of the light deflecting stages of said column including an electro optic device at the input side of its stage operable when energized to rotate the polarization plane of light transmitted thereby substantially ninety degrees, and a birefringent crystal in the path of said electro-optic device for causing an incident light beam passing through said electro-optic device and polarized in a given plane to experience a transverse displacement in passing through said crystal;

a plurality of selectively operable switches controlling the operation of the electro-optic devices in said column, thereby to control the ultimate transverse displacement of a light beam transmitted by said column, column output signaling means responsive to the displacement of the light beam by said column to furnish an electrical output signal indicative of such displacement, a group of light deflecting stages alined so that a beam of plane-polarized light may be passed through each of said stages with or without deflection thereof depending upon its plane of polarization, each of the light deflecting stages of said group including an electro-optic device at the input side of its stage operable when energized to rotate the polarization plane of light transmitted thereby substantially ninety degrees, and a birefringent crystal in the optical path of said electro-optic device for causing an incident light beam passing through said birefringent crystal and polarized in a predetermined plane to experience a transverse displacement in passing through said crystal;

and interconnecting means between said column output signaling means and the electro-optic devices of said group for causing the displacement of the last-mentioned beam to be determined by the displacement of the first-mentioned beam.

2. Light deflecting apparatus as set forth in claim 1 wherein:

the birefringent crystals of said column are adapted to impart equal displacements to a light beam polarized in said given plane; and said birefringent crystals of said group being so proportioned in relation to each other that successive ones of said crystals can impart to a beam of said predetermined polarization displacements that respectively vary according to consecutive powers of two; and said column output signaling means being adapted to convert the total displacement of the first-mentioned beam effected by said column into binary coded electrical signals which are applied by said interconnecting means to corresponding stages of said group.

3. A parallel optical adder for obtaining the sum of a plurality of multi-order binary numbers, comprising:

a plurality of sources of plane-polarized light beams, one for each of the binary orders of the numbers to be added;

a plurality of columns of light deflecting devices, one column for each of said binary orders, each column being arranged in the path of a respective one of said light beams and including:

a plurality of birefringent crystals, one corresponding to each of the numbers to be added, each of said crystals being adapted to deflect a light beam polarized in a given plane and to transmit without deflection a light beam polarized in an orthogonally related plane, the deflecting property of each said crystal being such that an emergent beam which has been deflected thereby is transversely displaced by a predetermined amount from its incident path, and a plurality of electro-optic crystals each in the optical path of and preceding a respective one of said birefringent crystals, each of said electro-optic crystals being selectively energizable to impart ninety degrees of rotation to a plane-polarized light beam passing through it;

a plurality of column registers, one for each of said binary orders, each register including a plurality of elements for storing the respective binary digits which are to be added in that order, said register elements of the corresponding order controlling the electro-optic crystals in the column of light deflecting devices associated with that order, whereby a light beam passing through such column is transversely displaced from its initial incident path by a total amount representing the sum of the binary digits registered for that column;

a plurality of optical encoding devices, one for each of said columns, each adapted to convert the beam displacement of its column into an encoded output signal comprising one or more parallel voltages representing weighted binary values equivalent to the sum of the respective column digits;

an additional source of a plane-polarized light beam;

groups of light deflecting devices each comprising alternately disposed electro-optic crystals and birefringent crystals, all of said groups being arranged in the path of the last-mentioned light beam, and each group being allocated to a respective one of said binary orders, the electro-optic crystals of each of said groups being responsive to the output signals of the respective encoding device for the corresponding column, the birefringent crystals of each of said groups being adapted respectively to displace a transmitted light beam of predetermined polarization transversely from its incident path by amounts which differ from one another as consecutive powers of two, and the birefringent crystals of each set above the lowest order thereof being adapted impart to such a beam transverse displacements that are twice as great as the displacements that can be imparted thereto by the corresponding birefringent crystals in the next lower-order set;

and final beam detecting means for supplying an indication of the total displacement experience by the last-mentioned light beam after it has passed through all of the light deflecting devices in said groups, such indication being commensurate with the total of said multi-order binary numbers.

4. Means for optically totalizing a plurality of multi-order binary numbers which comprises:

means for generating a plurality of plane-polarized light beams, each corresponding to one of the binary orders of said numbers.

means for selectively deflecting each of said light beams to a position where it is displaced transversely from its original beam axis by an amount representing the sum of all the binary digits of said numbers which are contained in a respective one of said binary orders, and means for selectively deflecting another plane-polarized light beam to a position where it is displaced transversely from its original beam axis by the sum of a plurality of amounts, each amount corresponding to the displacement of a respective one of said first-mentioned light beams multipled by the power of two which corresponds to the relative weight of the respective binary order, whereby the ultimate displacement of said other beam represents the sum of said multi-order binary numbers.

5. The optically totalizing means as set forth in claim 4 wherein the displacement of each of the first-mentioned light beams is equal to the sum of a plurality of smaller uniform displacements, each being effected in response to the presence of a significant digit in the particular binary order corresponding to that light beam.

6. Light deflecting apparatus comprising:

a plurality of columns of light deflecting stages alined so that a plurality of corresponding beams of plane-polarized light may be individually passed through each of its corresponding stages with or without deflection thereof depending upon its plane of polarization, each of said light deflecting stages of each column including an electro-optic device at the input side of its stage operable when energized to rotate the polarization plane of light transmitted thereby substantially ninety degrees, and a birefringent crystal in the optical path of said electro-optic device for causing an incident light beam passing through said electro-optic device and polarized in a given plane to experience a transverse displacement in passing through said crystal, a plurality of selectively operable switches controlling the operation of the electro-optic devices in each of said columns to thereby control the ultimate transverse displacement of a light beam transmitted by each of said columns, output signaling means, for each column, responsive to the displacement of the light beam by each column to furnish an electrical output signal indicative of such displacement, a group of light deflecting stages alined so that a beam of plane-polarized light may be passed through each of said stages with or without deflection thereof depending upon its plane of polarization, each of said light deflecting stages of said group including an electro-optic device at the input side of its stage operable when energized to rotate the polarization plane of light transmitted thereby substantially ninety degrees, and a birefringent crystal in the path of said electro-optic device for causing an incident light beam passing through said birefringent crystal and polarized in a predetermined plane to experience a transverse displacement in passing through said crystal, and interconnecting means between each column output signal means and its corresponding electro-optic devices of said group for causing the displacement of said last-mentioned beam to be determined by the displacements of the first-mentioned beams.

References Cited

UNITED STATES PATENTS

| | | | |
|---|---|---|---|
| 3,270,187 | 8/1966 | Fomenko | 235—152 |
| 3,329,474 | 7/1967 | Harris et al. | |

FOREIGN PATENTS

| | | |
|---|---|---|
| 953,229 | 10/1964 | France. |

OTHER REFERENCES

T. J. Nelson: Digital Light Deflection, May 1964, pp. 821–826.

MALCOLM A. MORRISON, Primary Examiner

DAVID H. MALZAHN, Assistant Examiner

U.S. Cl. X.R.

350—150; 250—220; 235—168